US010171310B2

(12) United States Patent
Hernandez et al.

(10) Patent No.: US 10,171,310 B2
(45) Date of Patent: Jan. 1, 2019

(54) ENSURING REGULATORY COMPLIANCE DURING APPLICATION MIGRATION TO CLOUD-BASED CONTAINERS

(71) Applicant: INTERNATIONAL BUSINESS MACHINES CORPORATION, Armonk, NY (US)

(72) Inventors: Milton H. Hernandez, Tenafly, NJ (US); Jill L. Jermyn, New York, NY (US); Clifford A. Pickover, Yorktown Heights, NY (US); Maja Vukovic, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 120 days.

(21) Appl. No.: 14/741,600

(22) Filed: Jun. 17, 2015

(65) Prior Publication Data
US 2016/0373289 A1 Dec. 22, 2016

(51) Int. Cl.
*H04L 12/24* (2006.01)
*H04L 29/08* (2006.01)

(52) U.S. Cl.
CPC .......... *H04L 41/16* (2013.01); *H04L 41/0816* (2013.01); *H04L 41/142* (2013.01); *H04L 41/22* (2013.01); *H04L 67/10* (2013.01)

(58) Field of Classification Search
None
See application file for complete search history.

(56) References Cited

U.S. PATENT DOCUMENTS

| 8,631,458 | B1 | 1/2014 | Banerjee |
| 2003/0004754 | A1 | 1/2003 | Krutz |
| 2011/0145393 | A1* | 6/2011 | Ben-Zvi ................ G06F 9/5011 709/224 |
| 2011/0270968 | A1 | 11/2011 | Salsburg et al. |
| 2011/0276951 | A1* | 11/2011 | Jain ..................... G06F 11/3006 717/140 |
| 2012/0011077 | A1* | 1/2012 | Bhagat .................. G06F 21/554 705/317 |
| 2012/0060171 | A1* | 3/2012 | Bobroff ................... G06F 9/505 718/105 |
| 2012/0179746 | A1 | 7/2012 | Bolgert et al. |

(Continued)

OTHER PUBLICATIONS

P. Mell et al., "The NIST Definition of Cloud Computing", National Institute of Standards and Technology, Information Technology Laboratory, Sep. 2011, pp. 1-7.

*Primary Examiner* — Thomas J Dailey
(74) *Attorney, Agent, or Firm* — Law Office of Jim Boice

(57) ABSTRACT

A method, system, and/or computer program product ensures regulatory compliance during application migration to cloud-based containers. In response to receiving a message directing an application to be migrated to a container cloud, the application is matched to multiple containers described in a container registry, where each container is matched to a service that provides a server. A regulatory rule by which at least one of the server, the application, and requisite containers are governed is identified. In response to detecting a change to at least one of the server, the application, and the requisite containers so that there is noncompliance with a regulatory rule, a chain of compliance services is automatically recomposed using an artificial intelligence planning technology.

19 Claims, 7 Drawing Sheets

(56) References Cited

U.S. PATENT DOCUMENTS

| | | |
|---|---|---|
| 2012/0203908 A1 | 8/2012 | Beaty et al. |
| 2012/0303776 A1* | 11/2012 | Ferris ................... G06F 9/5072 709/223 |
| 2012/0304179 A1 | 11/2012 | Devarakonda et al. |
| 2013/0204849 A1* | 8/2013 | Chacko ................. G06F 3/0604 707/692 |
| 2014/0137244 A1 | 5/2014 | Banerjee et al. |
| 2014/0149494 A1 | 5/2014 | Markley et al. |
| 2014/0237550 A1 | 8/2014 | Anderson et al. |

* cited by examiner

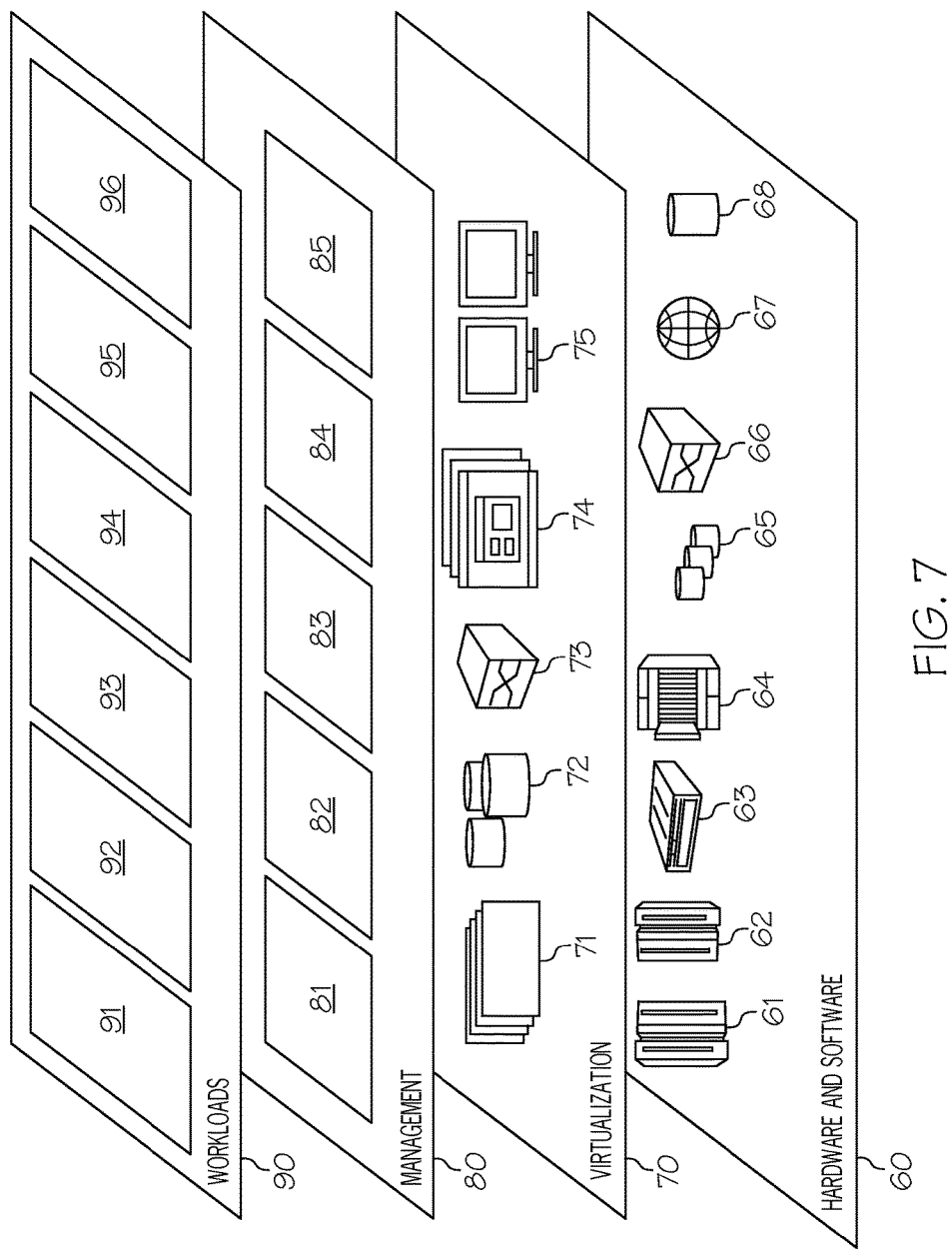

US 10,171,310 B2

ENSURING REGULATORY COMPLIANCE DURING APPLICATION MIGRATION TO CLOUD-BASED CONTAINERS

BACKGROUND

The present disclosure relates to the field of electronic devices, and specifically to the field of electronic devices that manage applications. Still more specifically, the present disclosure relates to the field of migrating applications to cloud-based containers.

A "container" is class of objects whose logical behavior is defined by a set of values and a set of operations. Containers are used to store objects following specific access rules. A group of containers is known as a container stack.

A "cloud" is a collection of remote servers and software networks that allow different kinds of data sources to be uploaded for real time processing.

A "container cloud" is a cloud of servers and networks that support containers.

SUMMARY

A method, system, and/or computer program product ensures regulatory compliance during application migration to cloud-based containers. In response to receiving a message directing an application to be migrated to a container cloud, the application is matched to multiple containers described in a container registry, where each container is matched to a service that provides a server. A regulatory rule by which at least one of the server, the application, and requisite containers are governed is identified. In response to detecting a change to at least one of the server, the application, and the requisite containers so that there is noncompliance with a regulatory rule, a chain of compliance services is automatically recomposed using an artificial intelligence planning technology.

BRIEF DESCRIPTION OF THE DRAWINGS

FIG. 7 depicts abstraction model layers according to an embodiment of the present disclosure.

DETAILED DESCRIPTION

Figure 1:
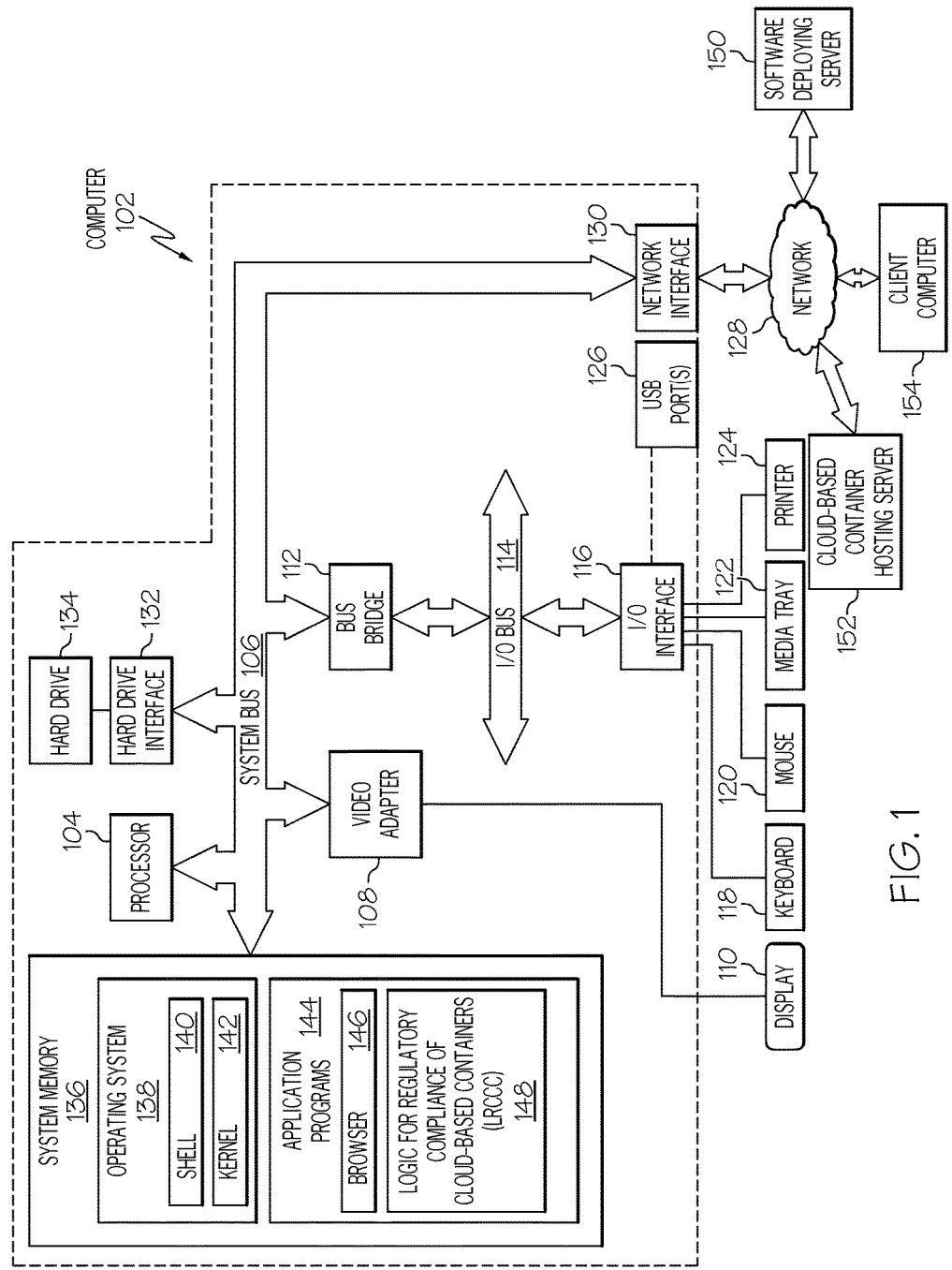
FIG. 1 depicts an exemplary system and network in which the present disclosure may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 102 may be utilized by software deploying server 150 and/or cloud-based container hosting server 152 and/or client computer 154.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150, using a network interface 130. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include Logic for Regulatory Compliance of Cloud-based Containers (LRCCC) 148. LRCCC 148 includes code for implementing the processes described below, including those described in FIGS. 2-4. In one embodiment, computer 102 is able to download LRCCC 148 from software deploying server 150, including in an on-demand basis, wherein the code in LRCCC 148 is not downloaded until needed for execution. In one embodiment of the present invention, software deploying server 150 performs all of the functions associated with the present invention (including execution of LRCCC 148), thus freeing computer 102 from having to use its own internal computing resources to execute LRCCC 148.

The hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Described herein is a system/method/service for automated compliance configuration during migration of an application to cloud-based containers. Source assets are remotely accessed to discover one or more compliance requirements that may apply to the application, particularly when migrated to cloud-based containers. Examples of such regulatory rules to which the application, containers, and supporting infrastructure (i.e., servers, networks, etc.) apply include, but are not limited to, ITAR (International Traffic & Arms Regulations); HIPAA (Health Insurance Portability and Accountability Act); HITECH (Health Information Technology for Economic and Clinical Health Act); CJIS (Criminal Justice Information System Database); GLBA (Gramm-Leach-Bliley Act); FERPA (Family Educational Rights and Privacy Act); SOX (Sarbanes-Oxley); PCI-PCI DSS (Related to accessing hosting company environments that are dealing with multi-tenant issues); FISM A-NIST 800-53-FedRAMP (for assisting clients in assessing and meeting FISMA requirements to attract Government agency business moving to the cloud as part of FedRAMP); and the governance, risk and compliance (GRC) standards suite, or stack, with four main elements: the Cloud Trust Protocol, Cloud Audit, Consensus Assessments Initiative and the Cloud Controls Matrix.

Similarly, the compliance requirement may involve regulations that offer specific guidance on handling personal information and cloud compliance for sensitive data, such that companies are bound to ensure that their information security policies and IT systems comply with the guidelines.

The method described herein may discover at least one standard that an auditor must employ in order to assess the contracted internal controls of a service organization like a hosted data center; insurance claims processor or credit processing company; or a company that provides outsourcing services that can affect the operation of the contracting enterprise (e.g., SS AE 16 and IS AE 3402).

The method described herein may facilitate Safe Harbor certification. That is, clouds may process personal data controlled by cloud customers. One or more embodiments of the present invention incorporate any regulations related to the providing of a self-certification that addresses what data the service collects and how the service processes such data. Safe Harbor is a process for organizations in the US and EU that store customer data designed to prevent accidental information disclosure or loss. Companies certified under Safe Harbor must follow several guidelines regarding how data is collected, used, transferred and secured.

The compliance requirement may involve certification of the ISO/IEC 27001:2005 Information Security Management (ISMS) Standard for data centers. The standard was created by the International Organization for Standardization (ISO) and is governed with the International Electro technical Commission (IEC). ISO/IEC 27001:2005 is the formal international security standard against which organizations may seek independent certification of their Information Security Management System (ISMS). It is intended to be used with ISO 27002:2005, a Security Code of Practice. ISO 27001 provides a model for establishing, implementing, operating, monitoring, reviewing, maintaining and improving ISMS, which is a framework of policies and procedures that includes all legal, physical and technical controls involved in an organization's information risk management processes.

During the operation of this service, the migration-facilitation tool can verify compliance with jurisdictional transfer and storage requirements for data migration into or within a cloud. In other words, the compliance and real-time discovery tool can monitor and check planned data transfers and storage to determine if the data transfer and/or storage will cross jurisdictional boundaries. The presently disclosed method includes remotely accessing source assets to discover at least one compliance requirement (e.g. HIPAA or ISEC), and these requirements may change through time.

Also, the service may evaluate compatibility of a cloud of computers to perform one or more workload tasks, given the discovered compliance requirements. The migration-facilitation service may make discoveries based on runtime-based application security. The service may dynamically modify execution of an application and then re-migrate it to a compliant cloud.

A developer-centric aspect is also disclosed that automatically assists application developers (in real-time) as they create apps and services that must take into consideration compliance (e.g. HIPAA) during the creation process. This functions as an automated "compliance advisor", with cognitive aspect involving learning techniques to reason about the patterns of non-compliant code/actions. Note that in one or more embodiments, for each service that does not fit the criteria, either a transformation occurs, or else the failed service is replaced with another service.

Figure 2:
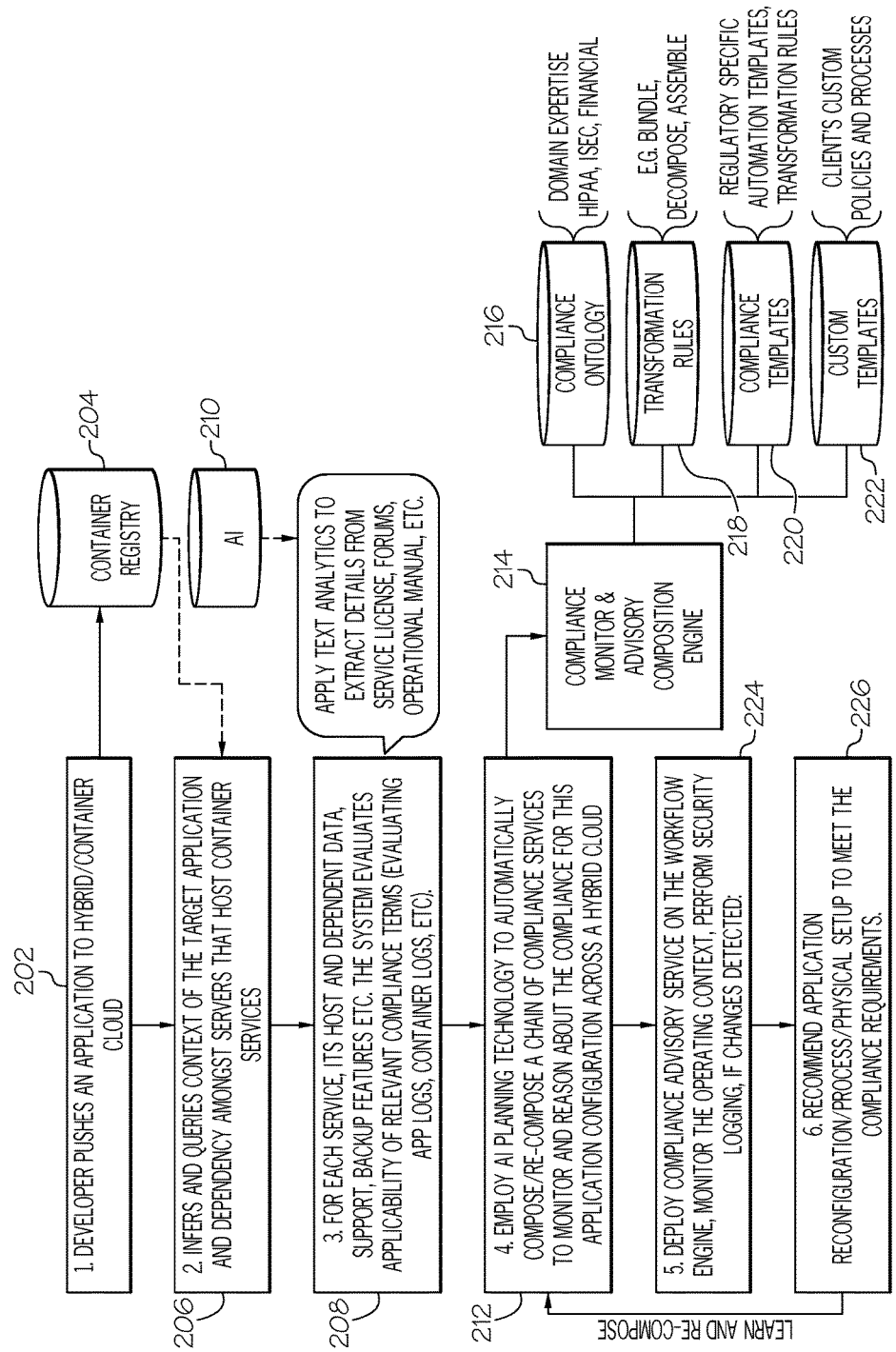
FIG. 2 illustrates a high-level overview of the present invention.

With reference now to FIG. 2, a high-level overview of the present invention is presented.

As described in block 202, a developer pushes an application to a container cloud, which may hold an application container, a data container, or a hybrid of both the application container and the data container.

In order to determine which container is appropriate for pushing the application onto, a container register 204 is consulted. The container register 204 includes identities, locations, and accessible resources of container infrastructures. That is, the container register 204 describes containers onto which the functionality of an initial application can be achieved.

For example, assume that a developer wants to deploy an expense reimbursement mobile application onto the cloud, rather than utilizing a local application that handles expense reimbursement. In order to identify which containers are appropriate for this migration, the container registry 204 is consulted. Information within the container registry 204 includes a description of the capabilities of the resources (e.g., servers, memory, network) available to particular containers.

As described in block 206, the system then utilizes information from the container registry 204 to determine which containers are appropriate for the application migration to the cloud. The containers are provided by various services, which include servers, backup storage, support services, etc. For example, a service may provide an Application Program Interface (API) to access a particular database, regulatory system, etc. Access to such databases/systems may be regulated by various compliance rules, according to what type of data is stored in the database/system (e.g., confidential information), wherein the data is stored (e.g., different countries have different compliance laws), etc.

Compliance rules may be statutory and thus mandatory (i.e., are mandated by political bodies), or they may be voluntary (i.e., are rules promulgated by an enterprise as a "best practices" guideline).

As described in block 208, the system then evaluates application logs, container logs, etc. provided by each service, as well as its host and dependent data, support, backup features, etc. to determine which compliance rules apply. In one embodiment of the present invention, an Artificial Intelligence (AI) system 210 applies text analytics to extract details from service licenses, forums, operational manuals, etc., as well as application/container logs, to determine which compliance rules applies.

As described in block 212, AI planning technology composes a chain of compliance services to monitor and reason about (i.e., determine why a particular compliance rule is applicable) the compliance for this particular application configuration across a hybrid cloud. In order to accomplish this task, a compliance monitor and advisory composition engine 214 is utilized. Compliance monitor and advisory composition engine 214 accesses a compliance ontology database 216, a transformation rules database 218, a compliance templates database 220, and a custom templates database 222.

The compliance ontology database 216 provides a database of the names and definitions of different regulatory rules, including those related to HIPAA, ISEC, financial regulations, etc. The ontology described in the compliance ontology database 216 allows the compliance monitor and advisory composition engine 214 to match features of containers described in the container registry 204 with requirements of the various compliance rules, thus establishing a relationship between them. More specifically, the AI 210 creates these ontology-based relationships, in order to limit the complexity of the problem of identifying and utilizing appropriate containers when handling specific regulatory rules.

The transformation rules database 218 contains rules to be followed when bundling, decomposing, assembling, etc. various combinations of containers and/or compliance services used to monitor how well the containers in the cloud comply with various regulatory rules.

The compliance templates database 220 and/or custom templates database 222 provide templates for an application developer and/or system to follow when creating an application that is to be migrated to cloud-based containers.

As described in block 224, the system then deploys a compliance advisory service. The compliance advisory service monitors the workflow engine (which is deploying/migrating the application to the cloud-based containers), monitors the operating context (i.e., where the application is being deployed to geographically, to what types of cloud-based systems the application is being deployed, etc.), and monitors security logging (i.e., tracking the security measures being utilized by the containers to which the application has been deployed). If any of these monitored features change to the point that the system is no longer in compliance with one or more regulatory rules, then the system recommends an application reconfiguration/process/physical setup to meet the compliance requirements (see block 226).

Once the recommended application reconfiguration/process/physical setup occurs, the AI planning technology can automatically re-compose the chain of compliance services, as indicated by the arrow from block 226 to block 212.

Figure 3:
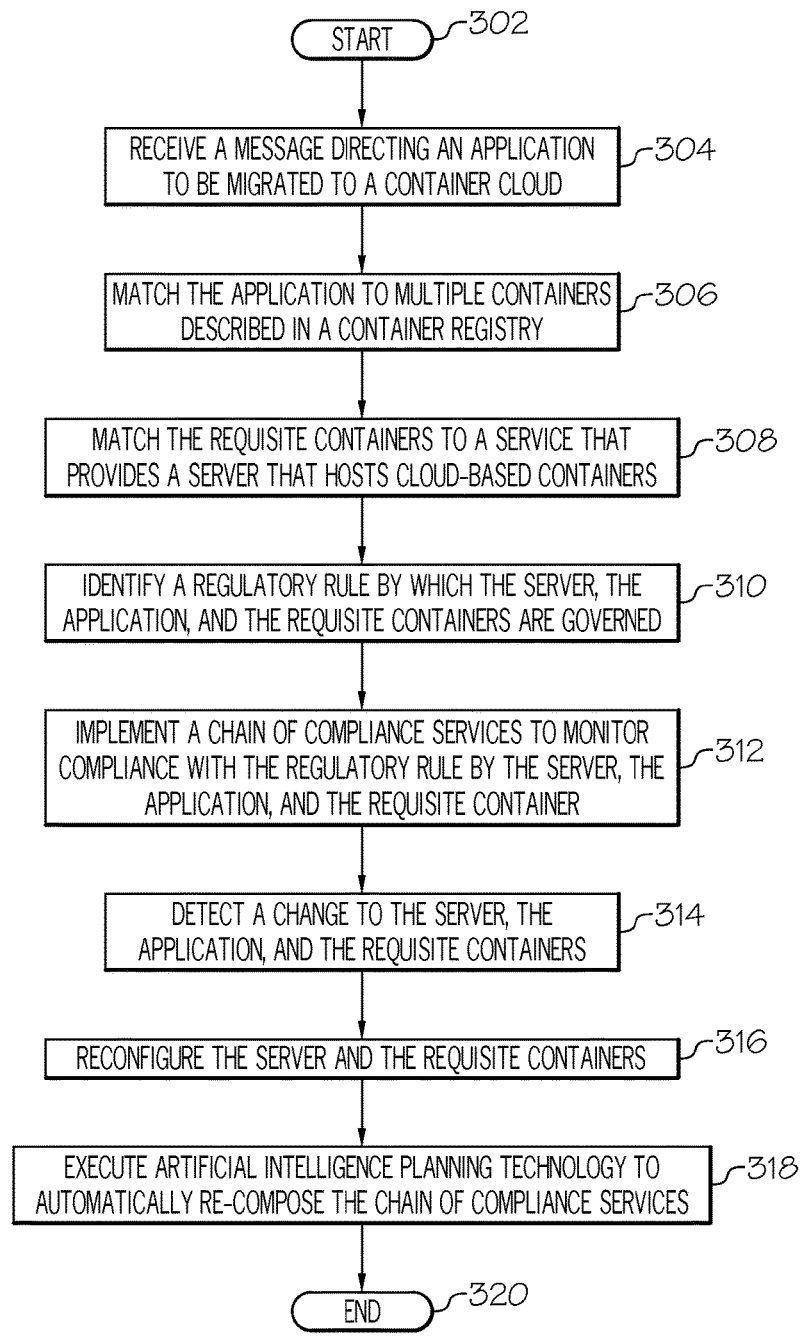
FIG. 3 is a flow chart of one or more steps performed by a processor to ensure regulatory compliance during application migration to cloud-based containers.

With reference now to FIG. 3, a flow chart of one or more steps performed by a processor to ensure regulatory compliance during application migration to cloud-based containers is presented.

After initiator block 302, a system (e.g., computer 102 shown in FIG. 1) receives a message (e.g., from client computer 154 in FIG. 1) directing an application to be migrated to a container cloud (e.g., a cloud-based collections of containers managed by the cloud-based container hosting server 152 in FIG. 1), as described in block 304.

As described in block 306, in response to receiving the message directing the application to be migrated to the container cloud, the system matches the application to multiple containers described in a container registry (e.g., container registry 204 shown in FIG. 2). This matching identifies requisite containers (i.e., those containers that are needed/required) for executing the application across multiple container stacks in a container cloud. Thus, the application is not migrated to a single container or even a single stack of containers, but rather is migrated across multiple container stacks. This requires a level of compliance granularity at the individual container level. That is, since the application is migrated to multiple container stacks, the system determines that each container used is compliant, even though the containers come from the different container stacks. Thus, a first container from a first stack may be rule compliant and a second container from a second stack may also be rule compliant. If so, then the application can be migrated to the first container and the second container, even if other containers within the first and second stacks are not rule compliant.

As described in block 308, the requisite containers are then matched to a service, which provides a server that hosts cloud-based containers. That is, once the needed containers are identified from the container register, they are then located according to a service that provides the infrastructure (i.e., a server on the cloud) that hosts the cloud-based containers.

As described in block 310, an identification is then made of which regulatory rule governs the server, the application, and the requisite containers. A chain of compliance services to monitor compliance with the regulatory rule by the server, the application, and the requisite container is then implemented (block 312).

Based on this monitoring, a change to the server, the application, and the requisite containers is detected (block 314). Based on this detected change and consequential rule non-compliance, (i.e., in response to detecting non-compliance with the regulatory rule by the server, the application, and the requisite containers after the change), the server and the requisite containers are reconfigured (block 316).

As described in block 318, after the server and containers are reconfigured (i.e., in response to reconfiguring the server and the requisite containers), an artificial intelligence (e.g., artificial intelligence 210 shown in FIG. 2) executes artificial intelligence planning technology to automatically re-compose the chain of compliance services. That is, since the server and containers have been changed, then the chain of compliance services that monitors their compliance with various regulatory rules also changes, since these different/changed servers/containers may come under the purview of different regulatory rules than the original servers/containers.

The process ends at terminator block 320.

In one embodiment of the present invention, the container cloud is a hybrid cloud that contains an application container service and a database container service. That is, two distinct container services are provided within a same hybrid cloud. One container service contains/provides the application that is being migrated to the cloud, and another container service contains/provides data that is required for executing the application by the containers.

In one embodiment of the present invention, an application log for the application is analyzed to identify terms found in the log that describe actions performed by the application. For example, a term in the log such as "submit payment of payroll withholdings" describes a calculation and bookkeeping/banking function of a payroll application. Thus, the system matches the identified terms from the application log to key terms used to describe the regulatory rule. For example, a particular state's regulatory rule regarding payroll withholding rules may include the term "submit payment of payroll withholdings within 5 days". By matching identified terms from the application log to key terms used to describe the regulatory rule, the system is able to further identify the regulatory rule that applies to the application.

In one embodiment of the present invention, terms found in container logs for the multiple containers are analyzed. The container log describes actions performed by the multiple containers. For example, assume again that the application that has been migrated to the containers is a payroll application. Assume further that a container log shows that a particular container has "transferred payroll withholdings to tax office". The identified terms from the container log are matched to key terms used to describe the regulatory rule (e.g., "send payroll withholdings to the tax office"). This match of the identified terms from the container log to key terms used to describe the regulatory rule enables the system to further identify the regulatory rule that is to be applied to usage of the containers.

In one embodiment of the present invention, a compliance monitor engine (e.g., the compliance monitory and advisory composition engine 214 shown in FIG. 2) further identifies the regulatory rule by matching types, relationships, and properties of the multiple container stacks to the identified regulatory rule. For example, assume that two container stacks are both database stacks (type) that depend on each other since each stack only holds part of the data, but together they hold all of the data needed by the containers (relationships), and both container stacks are all on the cloud (properties). Thus, if metadata or other descriptors of a particular compliance rule state that database stacks (type) that depend on each other (relationships) and are on the cloud (properties) must comply with this particular compliance rule, then there is a match.

In one embodiment of the present invention, an advisory message is transmitted to a developer of the application. This advisory message includes a description of requirements of the identified regulatory rule. For example, after the system determines that a particular regulatory rule is activated if the application is migrated to certain containers, then the system automatically sends a message to the application developer to include features in the application that comply with this regulatory rule. For example, if the regulatory rule prohibits storing a person's social security number on the cloud, then the application must be rewritten to use some other type of identifier that complies with the requirements of this regulatory rule.

In one embodiment of the present invention, a detection of non-compliance with the regulatory rule by the server, the application, and the requisite container is made by the system. In response to detecting non-compliance with the regulatory rule by the server, the application, and the requisite container, an advisory composition engine transforms the chain of compliance services by decomposing and rebundling resources provided by the chain of compliance services. That is, if the server, the application, and the requisite container are not all in compliance with one or more regulatory rules, then the chain of compliance services that monitor the server, the application, and the requisite container is reconfigured, since it failed to keep the server, the application, and the requisite container in compliance.

In one embodiment of the present invention, lines of code from the application are grouped according to different regulations, such that a first group of lines of code from the application is regulated by a first regulatory rule, and a second group of lines of code from the application is regulated by a second regulatory rule. In a further embodiment, a display of the first group of lines of code is visually modified to indicate an applicability of the first regulatory rule.

Figure 4:
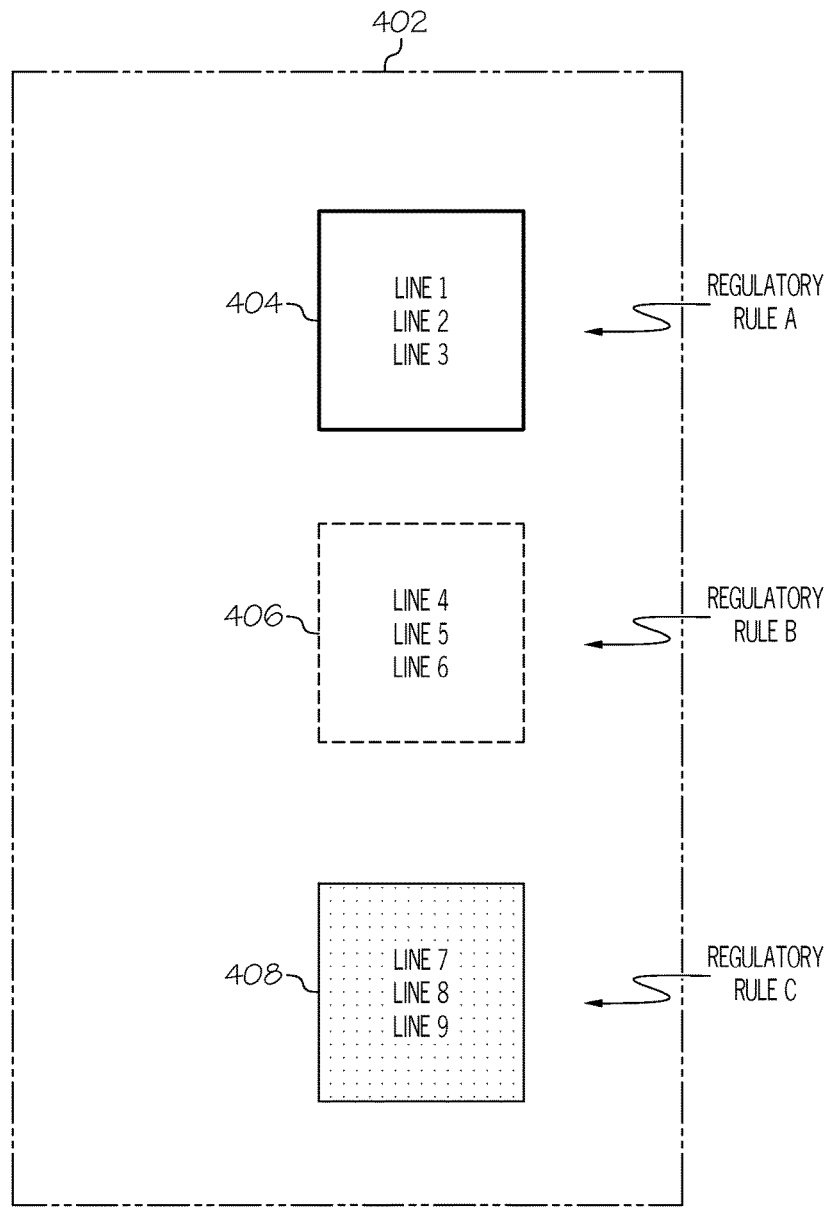
FIG. 4 illustrates lines of code from an application being grouped according to different regulations.

Consider now FIG. 4, which illustrates lines of code from an application 402 being grouped according to different regulations. For example, group 404 (lines of code 1-3 of application 402) are under the purview of regulatory rule A; group 406 (lines of code 4-6 of application 402) are under the purview of regulatory rule B; and group 408 (lines of code 7-9 of application 402) are under the purview of regulatory rule C.

For example, group 404 may be instructions directed to withholding taxes from a person's paycheck, and thus come under the purview of regulatory rule A, which is a tax regulation. Group 406 may be instructions directed to automatic deposit of funds to a retirement account, and thus come under the purview of regulatory rule B, which is a retirement fund regulation. Group 408 may be instructions to automatically deposit the net payroll of an employee into their personal bank account, and thus come under the purview of regulatory rule C, which is a banking regulation.

As shown in FIG. 4, group 404 is visually coded/modified with a bold outline, thus indicating that operations performed by the execution of code lines 1-3 of application 402 are under the purview of regulatory rule A. Other groups of code lines can likewise be visually modified to reflect a relationship to a particular regulatory rule, such as with a dashed line (see group 406), shading (see group 408), etc.

As described herein, the present invention analyzes an application configuration across different stacks (e.g. containers), and manages compliance at the container level, thus aiding advisory services to reconcile any compliance breach. In one or more embodiments described herein, artificial intelligence (AI) technology is applied to dynamically synthesize and compose compliance discovery actions in an approach to resolve compliance breach.

The present invention may be implemented using cloud computing, as now described. Nonetheless, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
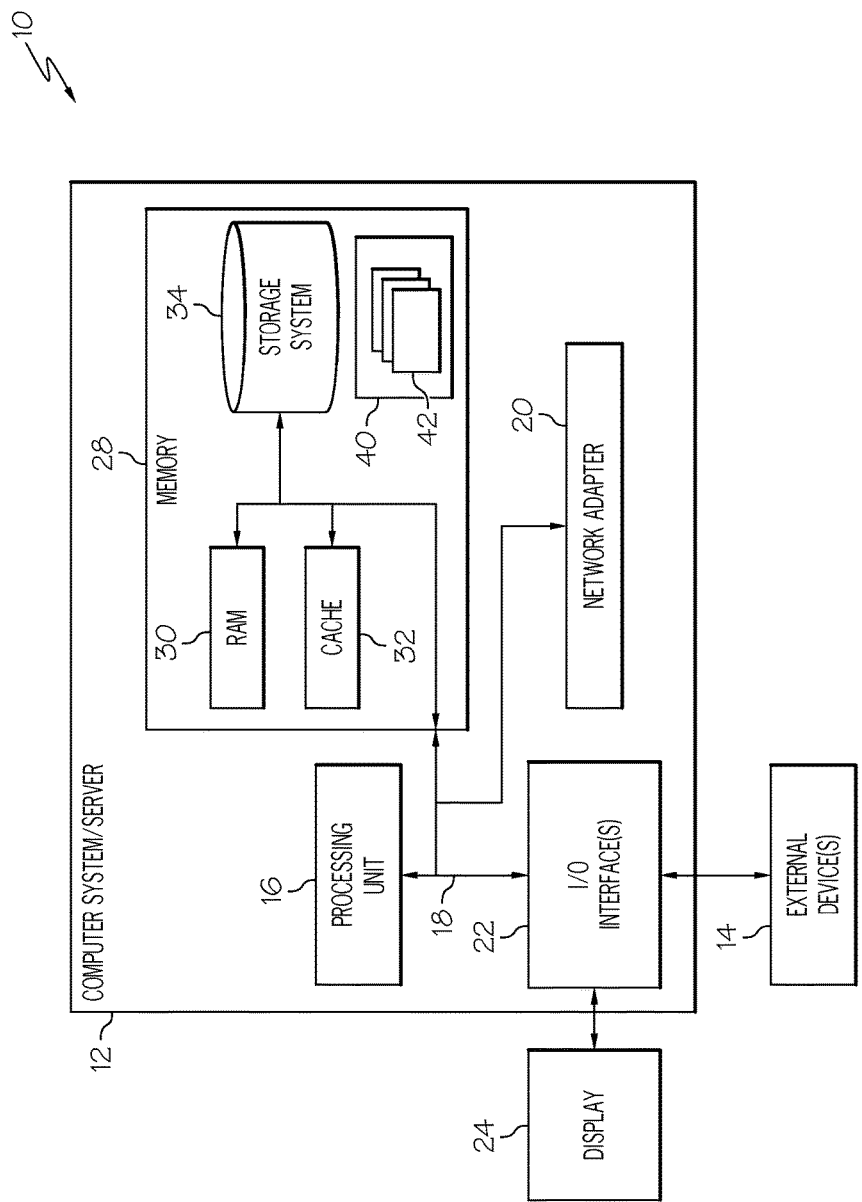
FIG. 5 depicts a cloud computing node according to an embodiment of the present disclosure.

Referring now to FIG. 5, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA)

bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 6:
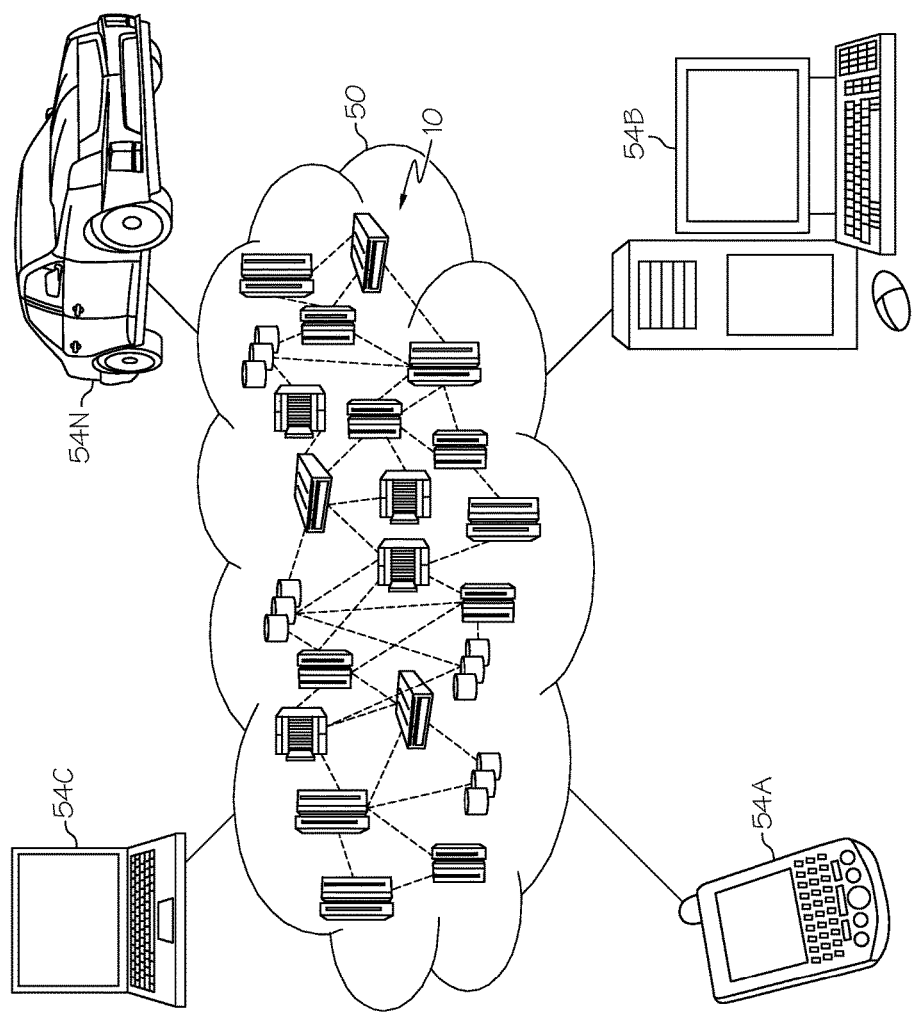
FIG. 6 depicts a cloud computing environment according to an embodiment of the present disclosure.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone MA, desktop computer MB, laptop computer MC, and/or automobile computer system MN may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices MA-N shown in FIG. 6 are intended to be illustrative only and that computing nodes 10 and cloud computing environment 50 can communicate with any type of computerized device over any type of network and/or network addressable connection (e.g., using a web browser).

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application migration processing 96 (for migrating applications to cloud-based containers as described herein).

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method of ensuring regulatory compliance during application migration to cloud-based containers, the method comprising:
    receiving, by one or more processors, a message directing an application to be migrated to a container cloud, wherein the container cloud is a cloud of servers and networks that support containers, wherein a container is a class of objects used to store objects following specific access rules;
    in response to receiving the message directing the application to be migrated to the container cloud, matching, by one or more processors, the application to multiple containers described in a container registry, wherein each container is matched to a service that provides a server, and wherein the server hosts cloud-based containers whose logical behavior is defined by a set of values and a set of operations;
    grouping, by one or more processors, lines of code from the application according to different regulations, wherein a first group of lines of code from the application is regulated by a first regulatory rule, and wherein a second group of lines of code from the application is regulated by a second regulatory rule;
    identifying, by one or more processors, at least one regulatory rule as an identified at least one regulatory rule by which the server, the application, and requisite containers are governed;
    detecting, by one or more processors, a change to at least one of the server, the application, and the requisite containers so that there is noncompliance with the identified at least one regulatory rule; and
    in response to detecting the change, automatically recomposing a chain of compliance services using an artificial intelligence planning technology, wherein the chain of compliance services monitors compliance with the identified at least one regulatory rule by the server and the requisite containers.

2. The method of claim 1, wherein the container cloud is a hybrid cloud that contains an application container service and a database container service, wherein the application container service contains the application, and wherein the database container service contains data required for executing the application by the requisite containers.

3. The method of claim 1, further comprising:
    analyzing, by one or more processors, terms found in an application log for the application, wherein the application log describes actions performed by the application;
    matching, by one or more processors, identified terms from the application log to key terms used to describe the identified at least one regulatory rule; and
    further identifying, by one or more processors, the identified at least one regulatory rule according to said matching identified terms from the application log to key terms used to describe the identified at least one regulatory rule.

4. The method of claim 1, further comprising:
    analyzing, by one or more processors, terms found in container logs for the multiple containers, wherein the container logs describe actions performed by the multiple containers;
    matching, by one or more processors, identified terms from the container logs to key terms used to describe the identified at least one regulatory rule; and
    further identifying, by one or more processors, the identified at least one regulatory rule according to said matching identified terms from the container logs to the key terms used to describe the identified at least one regulatory rule.

5. The method of claim 1, further comprising:
    further identifying, by a compliance monitor engine, the identified at least one regulatory rule by matching types, relationships, and properties of multiple container stacks to the identified at least one regulatory rule.

6. The method of claim 1, further comprising:
    transmitting, by one or more processors, an advisory message to a developer of the application, wherein the advisory message includes a description of requirements of the identified at least one regulatory rule.

7. The method of claim 1, further comprising:
    detecting, by one or more processors, non-compliance with the identified at least one regulatory rule by the server, the application, and the requisite containers; and
    in response to detecting non-compliance with the identified at least one regulatory rule by the server, the application, and the requisite containers, transforming, by an advisory composition engine, the chain of compliance services by decomposing and rebundling resources provided by the chain of compliance services.

8. The method of claim 1, further comprising:
visually modifying, by one or more processors, a display of the first group of lines of code to indicate an applicability of the first regulatory rule.

9. A computer program product for ensuring regulatory compliance during application migration to cloud-based containers, the computer program product comprising a non-transitory computer readable storage medium having program code embodied therewith, the program code readable and executable by a processor to perform a method comprising:
receiving a message directing an application to be migrated to a container cloud, wherein the container cloud is a cloud of servers and networks that support containers, wherein a container is a class of objects used to store objects following specific access rules;
in response to receiving the message directing the application to be migrated to the container cloud, matching the application to multiple containers described in a container registry, wherein each container is matched to a service that provides a server, and wherein the server hosts cloud-based containers whose logical behavior is defined by a set of values and a set of operations;
grouping lines of code from the application according to different regulations, wherein a first group of lines of code from the application is regulated by a first regulatory rule, and wherein a second group of lines of code from the application is regulated by a second regulatory rule;
identifying at least one regulatory rule as an identified at least one regulatory rule by which at least one of the server, the application, and requisite containers are governed;
detecting a change to at least one of the server, the application, and the requisite containers so that there is noncompliance with the identified at least one regulatory rule; and
in response to detecting the change, automatically recomposing a chain of compliance services using an artificial intelligence planning technology, wherein the chain of compliance services monitors compliance by the server and the requisite containers with the identified at least one regulatory rule.

10. The computer program product of claim 9, wherein the container cloud is a hybrid cloud that contains an application container service and a database container service, wherein the application container service contains the application, and wherein the database container service contains data required for executing the application.

11. The computer program product of claim 9, wherein the method further comprises:
analyzing terms found in container logs for the multiple containers, wherein the container logs describe actions performed by the multiple containers;
matching analyzed terms from the container logs to key terms used to describe the identified at least one regulatory rule; and
further identifying the identified at least one regulatory rule according to said matching analyzed terms from the container logs to the key terms used to describe the identified at least one regulatory rule.

12. The computer program product of claim 9, wherein the method further comprises:
transmitting an advisory message to a developer of the application, wherein the advisory message includes a description of requirements of the identified at least one regulatory rule.

13. The computer program product of claim 9, wherein the method further comprises:
detecting non-compliance with the identified at least one regulatory rule by the server, the application, and the requisite containers; and
in response to detecting non-compliance with the identified at least one regulatory rule by the server, the application, and the requisite containers, transforming, by an advisory composition engine, the chain of compliance services by decomposing and rebundling resources provided by the chain of compliance services.

14. A computer system comprising:
a processor, a computer readable memory, and a non-transitory computer readable storage medium;
first program instructions to receive a message directing an application to be migrated to a container cloud, wherein the container cloud is a cloud of servers and networks that support containers, wherein a container is a class of objects used to store objects following specific access rules;
second program instructions to, in response to receiving the message directing the application to be migrated to the container cloud, match the application to multiple containers described in a container registry, wherein said matching identifies requisite containers for executing the application across multiple container stacks in a container cloud;
third program instructions to group lines of code from the application according to different regulations, wherein a first group of lines of code from the application is regulated by a first regulatory rule, and wherein a second group of lines of code from the application is regulated by a second regulatory rule;
fourth program instructions to match the requisite containers to a service, wherein the service provides a server that hosts cloud-based containers;
fifth program instructions to identify at least one regulatory rule as an identified at least one regulatory rule by which the server, the application, and the requisite containers are governed;
sixth program instructions to implement a chain of compliance services to monitor compliance with the identified at least one regulatory rule by the server, the application, and the requisite containers;
seventh program instructions to detect a change to the server, the application, and the requisite containers;
eighth program instructions to, in response to detecting non-compliance with the identified at least one regulatory rule by the server, the application, and the requisite containers after the change, reconfigure the server and the requisite containers; and
ninth program instructions to, in response to reconfiguring the server and the requisite containers, execute artificial intelligence planning technology to automatically recompose the chain of compliance services, wherein the chain of compliance services monitors compliance by the server and the requisite containers with the identified at least one regulatory rule; and wherein
the first, second, third, fourth, fifth, sixth, seventh, eighth, and ninth program instructions are stored on the non-transitory computer readable storage medium for execution by one or more processors via the computer readable memory.

15. The computer system of claim 14, wherein the container cloud is a hybrid cloud that contains an application container service and a database container service, wherein the application container service contains the application, and wherein the database container service contains data required for executing the application.

16. The computer system of claim 14, further comprising:
   tenth program instructions to analyze terms found in an application log for the application, wherein the application log describes actions performed by the application;
   eleventh program instructions to match analyzed terms from the application log to key terms used to describe the identified at least one regulatory rule; and
   twelfth program instructions to further identify the identified at least one regulatory rule according to said matching analyzed terms from the application log to the key terms used to describe the identified at least one regulatory rule; and wherein the tenth, eleventh, and twelfth program instructions are stored on the non-transitory computer readable storage medium for execution by one or more processors via the computer readable memory.

17. The computer system of claim 14, further comprising:
   tenth program instructions to analyze terms found in container logs for the multiple containers, wherein the container logs describe actions performed by the multiple containers;
   eleventh instructions to match analyzed terms from the container logs to key terms used to describe the identified at least one regulatory rule; and
   twelfth program instructions to further identify the identified at least one regulatory rule according to said matching analyzed terms from the container logs to the key terms used to describe the identified at least one regulatory rule; and wherein the tenth, eleventh, and twelfth instructions are stored on the non-transitory computer readable storage medium for execution by one or more processors via the computer readable memory.

18. The computer system of claim 14, further comprising:
   tenth program instructions to further identify the identified at least one regulatory rule by matching types, relationships, and properties of the multiple container stacks to the identified at least one regulatory rule; and
   eleventh program instructions to transmit an advisory message to a developer of the application, wherein the advisory message includes a description of requirements of the identified at least one regulatory rule; and wherein
the tenth and eleventh program instructions are stored on the non-transitory computer readable storage medium for execution by one or more processors via the computer readable memory.

19. The computer system of claim 14, further comprising:
   tenth program instructions to detect non-compliance with the identified at least one regulatory rule by the server, the application, and the requisite containers;
   eleventh program instructions to, in response to detecting non-compliance with the identified at least one regulatory rule by the server, the application, and the requisite containers, transform the chain of compliance services by decomposing and rebundling resources provided by the chain of compliance services; and wherein
the tenth and eleventh program instructions are stored on the non-transitory computer readable storage medium for execution by one or more processors via the computer readable memory.

* * * * *